United States Patent
Saylor et al.

(10) Patent No.: US 12,319,106 B2
(45) Date of Patent: Jun. 3, 2025

(54) SUSPENSION CONTROL SYSTEMS AND METHODS BASED ON ROAD PREVIEW

(71) Applicant: GM GLOBAL TECHNOLOGY OPERATIONS LLC, Detroit, MI (US)

(72) Inventors: Brian K. Saylor, South Lyon, MI (US); Adam Douglas Stanton, Novi, MI (US); Matthew Watts, South Lyon, MI (US); Matthew Bruce, Plymouth, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 134 days.

(21) Appl. No.: 18/326,084

(22) Filed: May 31, 2023

(65) Prior Publication Data
US 2024/0399811 A1 Dec. 5, 2024

(51) Int. Cl.
*B60G 17/016* (2006.01)

(52) U.S. Cl.
CPC .... *B60G 17/0162* (2013.01); *B60G 2400/104* (2013.01); *B60G 2400/204* (2013.01); *B60G 2400/824* (2013.01); *B60G 2401/14* (2013.01); *B60G 2500/104* (2013.01); *B60G 2800/012* (2013.01)

(58) Field of Classification Search
CPC .......... B60G 17/0162; B60G 2400/104; B60G 2400/824; B60G 2500/104
See application file for complete search history.

(56) References Cited

U.S. PATENT DOCUMENTS

| | | | | |
|---|---|---|---|---|
| 6,092,014 A | * | 7/2000 | Okada | G01C 21/26 701/439 |
| 2005/0027402 A1 | * | 2/2005 | Koibuchi | B60W 30/1819 701/1 |
| 2005/0090956 A1 | * | 4/2005 | Ogawa | B60G 17/08 701/532 |
| 2007/0124051 A1 | * | 5/2007 | Fujita | B60G 17/0162 701/70 |
| 2010/0318262 A1 | * | 12/2010 | Mizuta | B60G 21/0558 701/38 |
| 2021/0379956 A1 | * | 12/2021 | Furuta | B60G 17/06 |

FOREIGN PATENT DOCUMENTS

JP    2020185940 A    * 11/2020

OTHER PUBLICATIONS

Hlrao et al., Vehicle Motion State Estimation Device, and Vehicle Motion State Estimation Method, EPO, JP 2020-185940 A, Machine Translation of Description (Year: 2020).*

* cited by examiner

*Primary Examiner* — James A English (57) ABSTRACT

A suspension control system includes: an acceleration module configured to determine a predicted lateral acceleration of a vehicle in the future based on a radius of curvature of a road a predetermined distance in front of the vehicle; and at least one of: a damping module configured to, before the vehicle reaches the curvature, selectively adjust damping coefficients of adjustable dampers of the vehicle based on the predicted lateral acceleration; and an active roll control (ARC) control module configured to, before the vehicle reaches the curvature, selectively adjust stiffness of ARC devices of the vehicle based on the predicted lateral acceleration.

17 Claims, 6 Drawing Sheets

SUSPENSION CONTROL SYSTEMS AND METHODS BASED ON ROAD PREVIEW

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle sensors and cameras and more particularly to systems and methods for controlling characteristics of suspension system components of vehicles based on predicted lateral acceleration.

Vehicles include one or more torque producing devices, such as an internal combustion engine and/or an electric motor. A passenger of a vehicle rides within a passenger cabin (or passenger compartment) of the vehicle.

Vehicles may include one or more different type of sensors that sense vehicle surroundings. One example of a sensor that senses vehicle surroundings is a camera configured to capture images of the vehicle surroundings. Examples of such cameras include forward-facing cameras, rear-facing cameras, and side facing cameras. Another example of a sensor that senses vehicle surroundings includes a radar sensor configured to capture information regarding vehicle surroundings. Other examples of sensors that sense vehicle surroundings include sonar sensors and light detection and ranging (LIDAR) sensors configured to capture information regarding vehicle surroundings.

SUMMARY

In a feature, a suspension control system includes: an acceleration module configured to determine a predicted lateral acceleration of a vehicle in the future based on a radius of curvature of a road a predetermined distance in front of the vehicle; and at least one of: a damping module configured to, before the vehicle reaches the curvature, selectively adjust damping coefficients of adjustable dampers of the vehicle based on the predicted lateral acceleration; and an active roll control (ARC) control module configured to, before the vehicle reaches the curvature, selectively adjust stiffness of ARC devices of the vehicle based on the predicted lateral acceleration.

In further features, a curvature module is configured to determine the radius of curvature of the road based on an image from a forward facing camera of the vehicle.

In further features, a curvature module is configured to determine the radius of curvature of the road based on a location and heading of a vehicle.

In further features, the acceleration module is configured to increase a magnitude of the predicted lateral acceleration as the radius of curvature increases and decrease the magnitude of the predicted lateral acceleration as the radius of curvature decreases.

In further features, the suspension control system includes the damping module, and the damping module is configured to increase the damping coefficients of the adjustable dampers as the predicted lateral acceleration increases.

In further features, the damping module is configured to adjust the damping coefficients of all of the adjustable dampers of the vehicle based on the predicted lateral acceleration.

In further features, the damping module is configured to adjust the damping coefficients of only a subset of the adjustable dampers based on the predicted lateral acceleration.

In further features, an alert module is configured to output an alert via an alert device when the predicted lateral acceleration is greater than a predetermined maximum lateral acceleration of the vehicle.

In further features, the suspension control system includes the ARC control module, and the ARC control module is configured to increase the stiffness of the ARC devices as the predicted lateral acceleration increases.

In further features, the suspension control system includes the damping module, and the damping module is configured to: set the damping coefficients of the adjustable dampers based on a mode of operation of the adjustable dampers; determine a present lateral acceleration capability of the vehicle based on the mode; and before the vehicle reaches the curvature, increase the damping coefficients of adjustable dampers of the vehicle based on the predicted lateral acceleration when a magnitude of the predicted lateral acceleration is greater than the present lateral acceleration capability of the vehicle.

In further features, the damping module is configured to maintain the damping coefficients based on the mode when the predicted lateral acceleration is less than the present lateral acceleration capability of the vehicle.

In further features, the suspension control system includes the ARC control module, and the ARC module is configured to: set the stiffness of the ARC devices based on a mode of operation; determine a present lateral acceleration capability of the vehicle based on the mode; and before the vehicle reaches the curvature, increase the stiffness of ARC devices of the vehicle based on the predicted lateral acceleration when a magnitude of the predicted lateral acceleration is greater than the present lateral acceleration capability of the vehicle.

In further features, the ARC control module is configured to maintain the stiffness based on the mode when the predicted lateral acceleration is less than the present lateral acceleration capability of the vehicle.

In further features, the suspension control system includes both the damping module and the ARC control module.

In further features, the acceleration module is configured to determine the predicted lateral acceleration of the vehicle further based on a vehicle speed.

In a feature, a suspension control system includes: an acceleration module configured to determine a predicted lateral acceleration of a vehicle in the future based on a steering wheel angle of the vehicle; and at least one of: a damping module configured to, before the vehicle reaches the curvature, selectively adjust damping coefficients of adjustable dampers of the vehicle based on the predicted lateral acceleration; and an active roll control (ARC) control module configured to, before the vehicle reaches the curvature, selectively adjust stiffness of ARC devices of the vehicle based on the predicted lateral acceleration.

In further features, the acceleration module is configured to increase a magnitude of the predicted lateral acceleration as the steering wheel angle moves away from a predetermined steering wheel angle where the vehicle moves longitudinally.

In further features, the acceleration module is configured to decrease the magnitude of the predicted lateral acceleration as the steering wheel angle moves toward the predetermined steering wheel angle where the vehicle moves longitudinally.

In further features, the suspension control system includes the ARC control module and the damping module.

In a feature, a suspension control method includes: determining a predicted lateral acceleration of a vehicle in the future based on a radius of curvature of a road a predetermined distance in front of the vehicle; and at least one of: before the vehicle reaches the curvature, selectively adjusting damping coefficients of adjustable dampers of the vehicle based on the predicted lateral acceleration; and before the vehicle reaches the curvature, selectively adjusting stiffness of active roll control (ARC) devices of the vehicle based on the predicted lateral acceleration.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may include a camera configured to capture images within a predetermined field of view (FOV) around an exterior of the vehicle. A perception module may perceive objects around the vehicle and determine locations of the objects. For example, a camera may be used to capture images including a road in front of the vehicle. Lane lines and objects on the road can be identified using images from the camera.

The present application involves, at a present time, predicting future lateral acceleration of a vehicle based on, for example, a curvature of a road in front of the vehicle and a vehicle speed. A suspension control module adjusts damping coefficients of one or more dampers of the vehicle and/or stiffness of one or more active roll control (ARC) devices based on the predicted future lateral acceleration to prepare the vehicle for the curvature. This increases vehicle cornering performance and feel.

Figure 1:
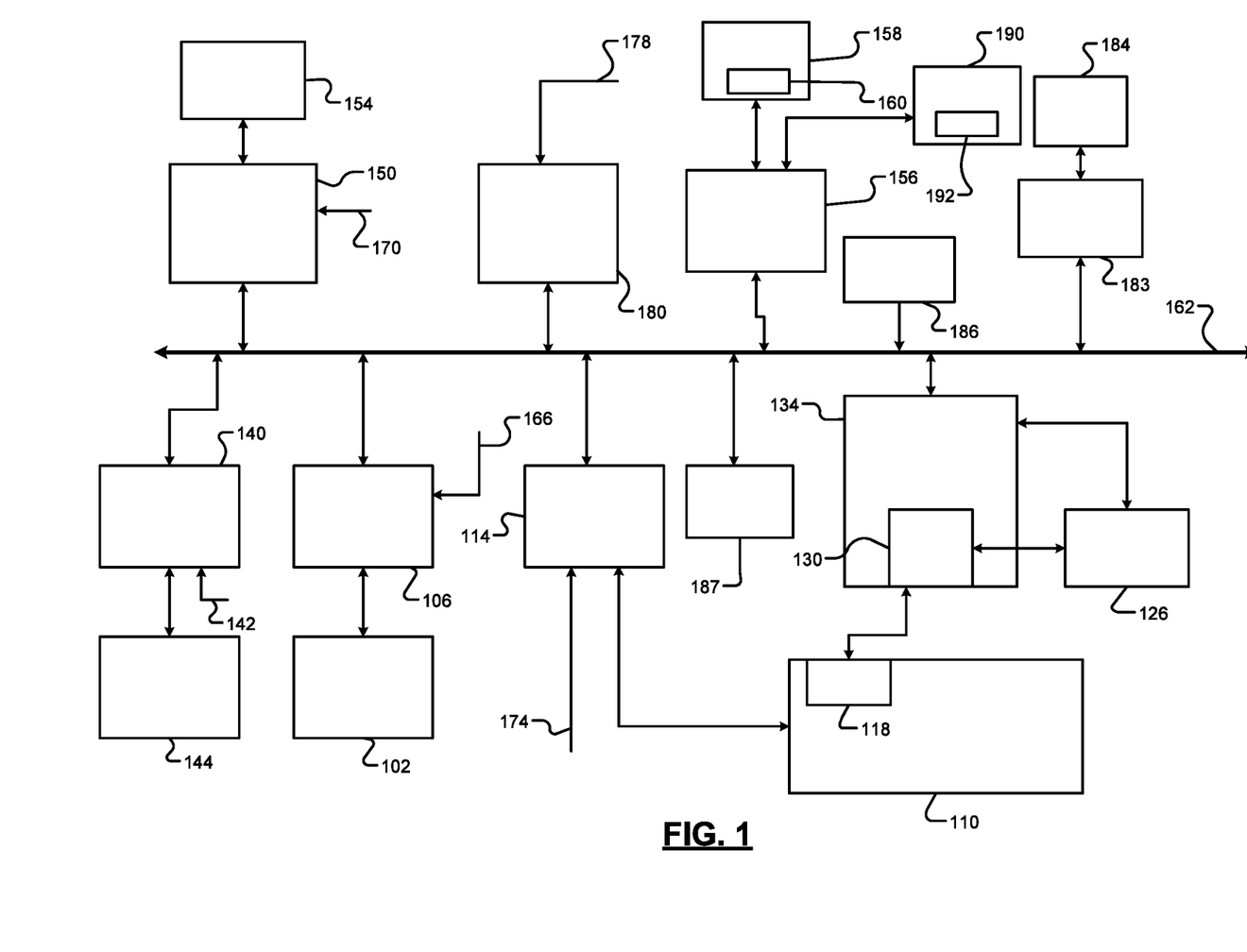
FIG. 1 is a functional block diagram of an example vehicle system.

Referring now to FIG. 1, a functional block diagram of an example vehicle system is presented. While a vehicle system for a hybrid vehicle is shown and will be described, the present application is also applicable to non-hybrid vehicles, electric vehicles, fuel cell vehicles, and other types of vehicles. The present application is applicable to autonomous vehicles, semi-autonomous vehicles, non-autonomous vehicles, shared vehicles, non-shared vehicles, and other types of vehicles.

An engine 102 may combust an air/fuel mixture to generate drive torque. An engine control module (ECM) 106 controls the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter module (PIM) 134 may control the electric motor 118 and the PCD 130. The PCD 130 applies power from the battery 126 to the electric motor 118 based on signals from the PIM 134, and the PCD 130 provides power output by the electric motor 118, for example, to the battery 126. The PIM 134 may include, for example, an inverter.

A steering control module 140 controls steering/turning of wheels of the vehicle, for example, based on driver turning of a steering wheel within the vehicle and/or steering commands from one or more vehicle control modules. A steering wheel angle (SWA) sensor (not shown) monitors rotational position of the steering wheel and generates a SWA 142 based on the position of the steering wheel. As an example, the steering control module 140 may control vehicle steering via an electronic power steering (EPS) motor 144 based on the SWA 142. However, the vehicle may include another type of steering system.

A brake control module 150 may selectively control (e.g., friction) brakes 154 of the vehicle based on one or more driver inputs, such as a brake pedal position (BPP) 170. A suspension control module 156 controls damping of dampers 158 of the wheels, respectively, of the vehicle. The dampers 158 damp vertical motion of the wheels. The suspension control module 156 may control, for example, damping coefficients of the dampers 158, respectively. For example, the dampers 158 may include magnetorheological dampers, continuous damping control (CDC) dampers, or another suitable type of adjustable damper. The dampers 158 include actuators 160 that adjust damping of the dampers 158, respectively. In the example of magnetorheological dampers, the actuators 160 may adjust magnetic fields applied to magnetorheological fluid within the dampers 158, respectively, to adjust damping. The suspension control module 156 also controls stiffness of active roll control (ARC) devices 190. The ARC devices 190 each include a sway bar and an actuator 192 (e.g., an electric motor) that adjusts stiffness of the swaybar. As stiffness of a swaybar increases, that ARC device 190 increasingly resists roll and vice versa.

Modules of the vehicle may share parameters via a network 162, such as a controller area network (CAN). A CAN may also be referred to as a car area network. For example, the network 162 may include one or more data buses. Various parameters may be made available by a given module to other modules via the network 162.

The driver inputs may include, for example, an accelerator pedal position (APP) 166 which may be provided to the ECM 106. The BPP 170 may be provided to the brake control module 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

An infotainment module 183 may output various information via one or more output devices 184. The output devices 184 may include, for example, one or more displays (non-touch screen and/or touch screen), one or more other suitable types of video output devices, one or more speakers, one or more haptic devices, and/or one or more other suitable types of output devices.

The infotainment module 183 may output video via the one or more displays. The infotainment module 183 may output audio via the one or more speakers. The infotainment module 183 may output other feedback via one or more haptic devices. For example, haptic devices may be included with one or more seats, in one or more seat belts, in the steering wheel, etc. Examples of displays may include, for example, one or more displays (e.g., on a front console) of the vehicle, a head up display (HUD) that displays information via a substrate (e.g., windshield), one or more displays that drop downwardly or extend upwardly to form panoramic views, and/or one or more other suitable displays.

The vehicle may include a plurality of external sensors and cameras, generally illustrated in FIG. 1 by 186. One or more actions may be taken based on input from the external sensors and cameras 186. For example, the infotainment module 183 may display video, various views, and/or alerts on a display via input from the external sensors and cameras 186 during driving.

As another example, based on input from the external sensors and cameras 186, a curvature module 404 (FIG. 4), such as of the suspension control module 156, may determine a radius of curvature of a road in front of the vehicle based on one or more images from a forward facing camera. The suspension control module 156 may determine a future lateral (centripetal) acceleration of the vehicle, such as based on the radius of curvature of the road in front of the vehicle. The suspension control module 156 adjusts damping of one or more (e.g., all) of the dampers based on the future lateral acceleration. The dampers are then set to counteract the lateral acceleration in the future. Additionally or alternatively, the suspension control module 156 adjusts stiffness of one or more of the ARC devices 190 based on the future lateral acceleration. The ARC device(s) 190 are then set to counteract the lateral acceleration in the future.

The vehicle may include one or more additional control modules that are not shown, such as a chassis control module, a battery pack control module, etc. The vehicle may omit one or more of the control modules shown and discussed.

Figure 2:
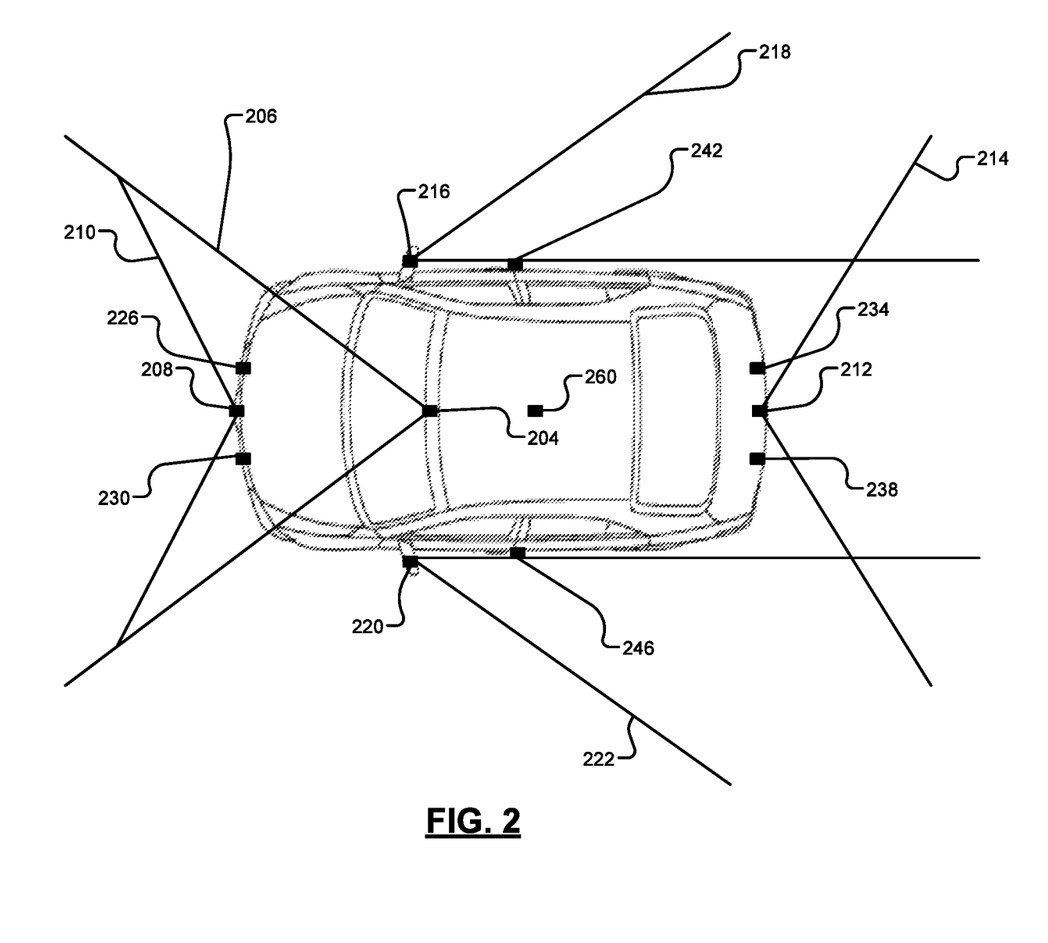
FIG. 2 is a functional block diagram of a vehicle including various external cameras and sensors.

Referring now to FIG. 2, a functional block diagram of a vehicle including examples of external sensors and cameras is presented. The external sensors and cameras 186 (FIG. 1) include various cameras positioned to capture images and video outside of (external to) the vehicle and various types of sensors measuring parameters outside of (external to) the vehicle. Examples of the external sensors and cameras 186 will now be discussed. For example, a forward-facing camera 204 captures images and video of images within a predetermined field of view (FOV) 206 in front of the vehicle.

A front camera 208 may also capture images and video within a predetermined FOV 210 in front of the vehicle. The front camera 208 may capture images and video within a predetermined distance of the front of the vehicle and may be located at the front of the vehicle (e.g., in a front fascia, grille, or bumper). The forward-facing camera 204 may be located more rearward, however, such as with a rear-view mirror at a windshield of the vehicle. The forward-facing camera 204 may not be able to capture images and video of items within all of or at least a portion of the predetermined FOV of the front camera 208 and may capture images and video more than the predetermined distance of the front of the vehicle. In various implementations, only one of the forward-facing camera 204 and the front camera 208 may be included.

A rear camera 212 captures images and video within a predetermined FOV 214 behind the vehicle. The rear camera 212 may be located at the rear of the vehicle, such as near a rear license plate.

A right camera 216 captures images and video within a predetermined FOV 218 to the right of the vehicle. The right camera 216 may capture images and video within a predetermined distance to the right of the vehicle and may be located, for example, under a right side rear-view mirror. In various implementations, the right side rear-view mirror may be omitted, and the right camera 216 may be located near where the right side rear-view mirror would normally be located.

A left camera 220 captures images and video within a predetermined FOV 222 to the left of the vehicle. The left camera 220 may capture images and video within a predetermined distance to the left of the vehicle and may be located, for example, under a left side rear-view mirror. In various implementations, the left side rear-view mirror may be omitted, and the left camera 220 may be located near where the left side rear-view mirror would normally be located. While the example FOVs are shown for illustrative purposes, the present application is also applicable to other FOVs. In various implementations, FOVs may overlap, for example, for more accurate and/or inclusive stitching.

The external sensors and cameras 186 may additionally or alternatively include various other types of sensors, such as light detection and ranging (LIDAR) sensors, ultrasonic sensors, radar sensors, and/or one or more other types of sensors. For example, the vehicle may include one or more forward-facing ultrasonic sensors, such as forward-facing ultrasonic sensors 226 and 230, one or more rearward facing ultrasonic sensors, such as rearward facing ultrasonic sensors 234 and 238. The vehicle may also include one or more right side ultrasonic sensors, such as right side ultrasonic sensor 242, and one or more left side ultrasonic sensors, such as left side ultrasonic sensor 246. The vehicle may also include one or more light detection and ranging (LIDAR) sensors, such as LIDAR sensor 260. The locations of the cameras and sensors are provided as examples only and different locations could be used. Ultrasonic sensors output ultrasonic signals around the vehicle.

The external sensors and cameras 186 may additionally or alternatively include one or more other types of sensors, such as one or more sonar sensors, one or more radar sensors, and/or one or more other types of sensors. In various implementations, only a forward facing camera (e.g., 204) may be included or used for the oil detection and control features described herein.

Figure 3:
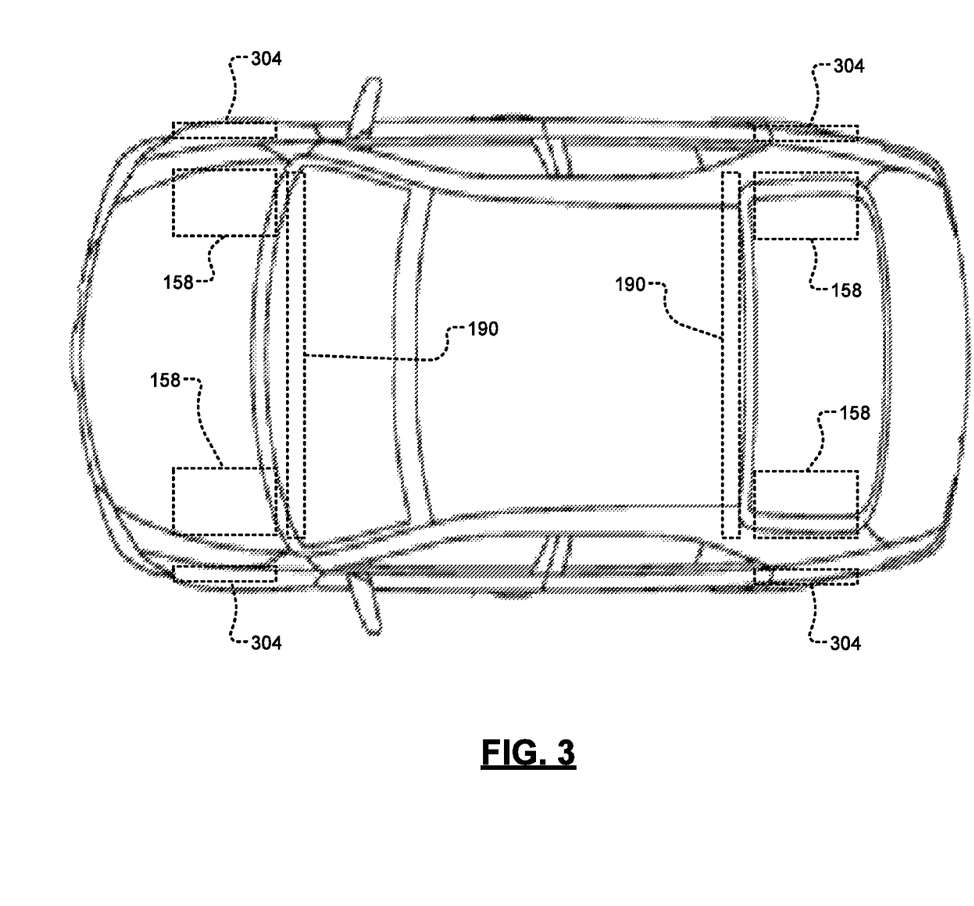
FIG. 3 is a functional block diagram of an example implementation of the vehicle.

FIG. 3 is a top view of the example vehicle of FIG. 2. FIG. 3 illustrates examples of wheels 304, the dampers 158, and the ARC devices 190. The dampers 158 damp vertical motion of the wheels 304, respectively. As stated above, for example, the dampers 158 may include magnetorheological dampers, continuous damping control dampers, or another suitable type of adjustable damper.

The ARC devices 190 each include a sway bar and an actuator (e.g., an electric motor). One ARC device 190 may be provided for a front axle of the vehicle and one ARC device 190 may be provided for a rear axle of the vehicle.

The vehicle experiences lateral acceleration when turning, such as based on curvature of a road on which the vehicle is driving. As discussed further below, the suspension control module 156 predicts future lateral acceleration of the vehicle and adjusts damping coefficients of the dampers 158 and/or stiffness of the ARC devices 190 to counteract the future lateral acceleration.

Figure 4:
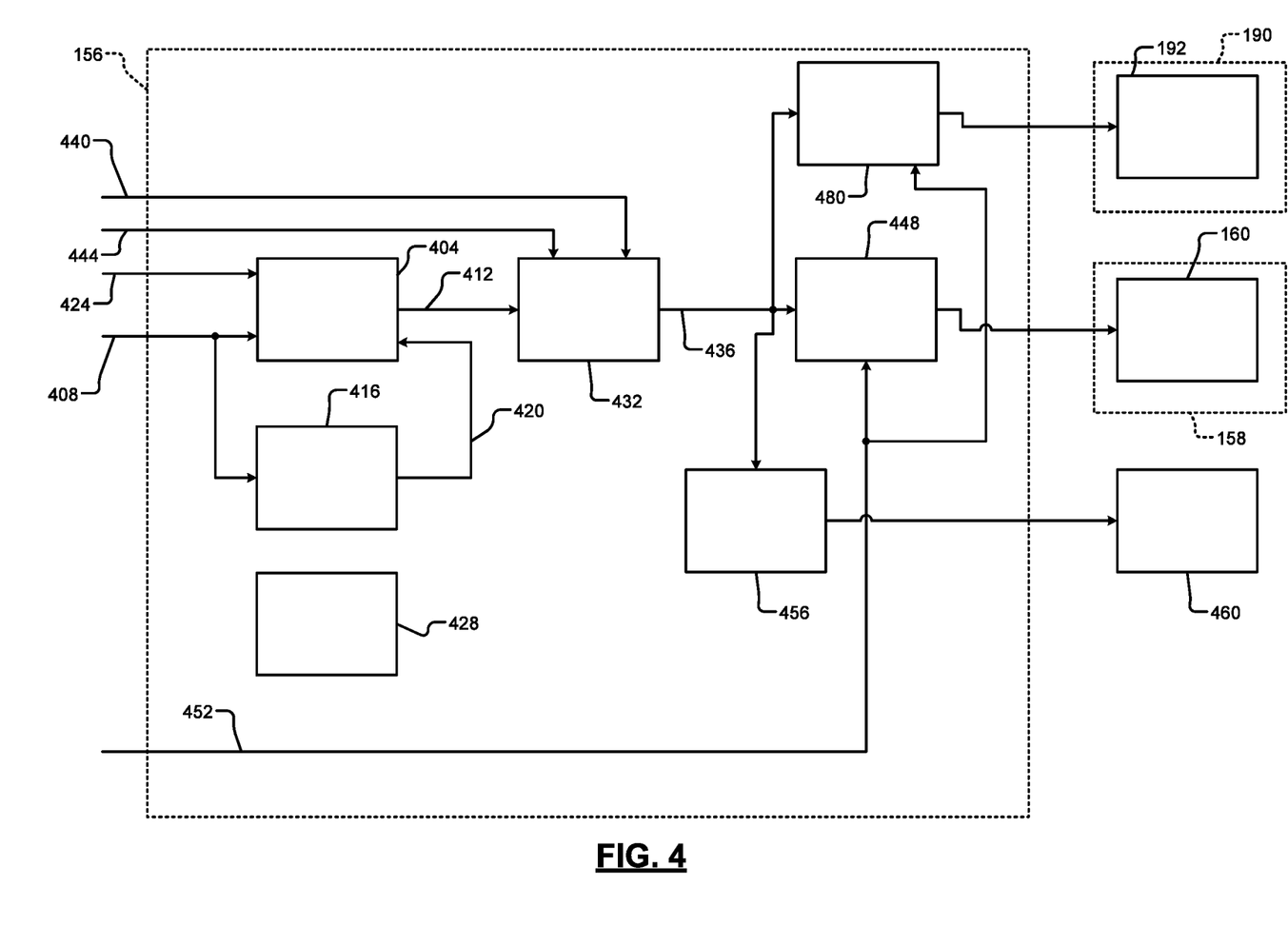
FIG. 4 is a functional block diagram of an example implementation of a suspension control system.

FIG. 4 is a functional block diagram of an example implementation of the suspension control module 156. A curvature module 404 receives images 408 including a portion of the road in front of the vehicle from a forward-facing camera (e.g., the camera 204). The curvature module 404 determines a radius of curvature of the road a predetermined distance in front of the vehicle from the images 408. The predetermined distance may be, for example, 50 feet, 100 feet, or another suitable distance in front of the vehicle. The curvature module 404 may update the radius of curvature each time an image is received. The forward facing camera may capture images at a predetermined frequency, such as 60 Hertz or another suitable frequency.

In various implementations, the curvature module 404 may determine the radius of curvature of a present lane of the vehicle. A lane module 416 may identify lane boundaries 420 of the present lane of the vehicle from the image using object detection.

Additionally or alternatively to the use of the images 408, the curvature module 404 may determine the radius of curvature 412 the predetermined distance in front of the vehicle based on a global positioning system (GPS) location and heading 424 from a GPS module of the vehicle. The curvature module 404 may determine the radius of curvature 412 the predetermined distance in front of the vehicle using radii of curvature data stored in a memory, such as a radius of curvature map 428. The map 428 may mapping of locations (e.g., geographical coordinates) and radius of curvature at the locations, respectively.

An acceleration module 432 determines a predicted lateral (centripetal) acceleration 436 of the vehicle at a future time. The predicted lateral acceleration 436 is different than a measured acceleration at a present time measured by an acceleration sensor, such as an inertial measurement unit (IMU) of the vehicle. The future time is after the present time. The acceleration module 432 may determine the predicted lateral acceleration 436 based on the radius of curvature and a present vehicle speed 440. The vehicle speed 440 may be measured, such as using one or more wheel speed sensors of the vehicle or received, such as from the GPS module. The acceleration module 432 may determine the predicted lateral acceleration 436 for example using one of a lookup table and an equation that relates vehicle speeds and radii of curvature to lateral acceleration. For example, the acceleration module 432 may set the predicted lateral acceleration 436 based on or equal to $v^2/r$ where v is the vehicle speed 440 and r is the radius of curvature 412.

Alternatively to determining the predicted lateral acceleration 436 based on the radius of curvature 412 and the vehicle speed 440, the acceleration module 432 may determine the predicted lateral acceleration 436 based on the SWA 444 measured by the SWA sensor or a change in the SWA 444 over a period (e.g., between consecutive samples). Turning of the steering wheel (and changing of the SWA 444) does not immediately result in lateral acceleration. Thus, use of the SWA 444 still allows for prediction of lateral acceleration in the future. The acceleration module 432 may determine the predicted lateral acceleration 436 using an equation or a lookup table that relates SWAs to predicted lateral accelerations. The predicted lateral acceleration may increase in magnitude as the SWA increases (moves away from a 0 angle corresponding to straight travel of the vehicle in a longitudinal direction) and vice versa. Predicted lateral acceleration, however, is in a direction (polarity) opposite to the SWA 444. For example, for leftward movement, the predicted lateral acceleration is in the rightward direction-away from the curve/turn. In various implementations, the acceleration module 432 may determine the predicted lateral acceleration 436 further based on the vehicle speed 440.

A damping module 448 actuates the actuators 160 thereby controlling the damping coefficients of the dampers 158. An ARC control module 480 actuates the actuators 192 thereby controlling the stiffness of the ARC devices 190. The damping module 448 and the ARC control 480 module generally actuate the actuators 160 and 190 based on a (suspension) mode 452. The mode 452 may be changed by a user via actuating a mode input device, such as a button, switch, etc. or the infotainment module 183. Examples of modes include a sport mode, a normal mode, a comfort mode, etc. While example mode names and numbers of modes are provided, the present application is also applicable to modes named differently and other numbers of modes.

The damping module 448 and the ARC control module 190 may determine settings (e.g., power, hydraulic pressure, etc.) for the actuators 160 and 192 based on the mode 452, for example, using a lookup table that relates modes to actuator settings. Each setting corresponds to different predetermined damping coefficients of the dampers 158 and stiffnesses of the ARC devices 190. For example, the dampers 158 may have a first predetermined damping coefficient and the ARC devices 190 may have a first predetermined stiffness when the mode 452 is set to the sport mode. The dampers 158 may have a second predetermined damping coefficient and the ARC devices 190 may have a second predetermined stiffness when the mode 452 is set to the normal mode. The dampers 158 may have a third predetermined damping coefficient and the ARC devices 190 may have a third predetermined stiffness when the mode 452 is set to the comfort mode. The first predetermined damping coefficient may be greater than the second predetermined damping coefficient, and the second predetermined damping coefficient may be greater than the third predetermined damping coefficient. The first predetermined stiffness may be greater than the second predetermined stiffness, and the second predetermined stiffness may be greater than the third predetermined stiffness.

The damping module 448 selectively adjusts one or more of the actuators 160 and adjusts the damping coefficients of the associated one or more of the dampers 158, respectively, based on the predicted lateral acceleration 436. In various implementations, the damping module 448 may adjust all of the actuators 160 and the damping coefficients of all of the dampers 158 based on the predicted lateral acceleration 436. Additionally or alternatively, the ARC module 480 selectively adjusts one or more of the actuators 192 and adjusts the stiffness of the associated one or more of the ARC devices 190, respectively, based on the predicted lateral acceleration 436. In various implementations, the ARC control module 480 may adjust all of the actuators 192 and the stiffnesses of all of the ARC devices 190 based on the predicted lateral acceleration 436.

The damping module 448 may determine a damping coefficient based on the predicted lateral acceleration 436 and adjust the actuators 160 based on or to the damping coefficient. The ARC control module 480 may determine a stiffness based on the predicted lateral acceleration 436 and adjust the actuators 192 based on or to the damping coefficient. For example, when the predicted lateral acceleration 436 is within a first predetermined acceleration range, the damping module 448 may set the damping coefficient to the third predetermined damping coefficient and the ARC control module 480 may set the stiffness to the third predetermined stiffness. The first predetermined acceleration range may be, for example, 0 to less than 3 meters per second squared or another suitable range. When the predicted lateral acceleration 436 is within a second predetermined acceleration range, the damping module 448 may set the damping coefficient to the second predetermined damping coefficient and the ARC control module 480 may set the stiffness to the second predetermined stiffness. The second predetermined acceleration range may be, for example, 3 to less than 6 meters per second squared or another suitable range. The lower boundary of the second predetermined acceleration range is greater than the upper boundary of the first predetermined acceleration range. When the predicted lateral acceleration 436 is greater than the upper boundary of the second predetermined acceleration range, the damping module 448 may set the damping coefficient to the first predetermined damping coefficient and the ARC control module 480 may set the stiffness to the first predetermined stiffness. This may be, for example, 6 meters per second squared or another suitable value.

In various implementations, the damping module 448 may determine the damping coefficient based on the predicted lateral acceleration 436 using an equation or a lookup table and adjust the actuators 160 based on or to the damping coefficient. The equation or lookup table relates predicted lateral accelerations to damping coefficients. For example, the damping coefficient may increase as predicted lateral acceleration increases and vice versa. In various implementations, the ARC control module 480 may determine the stiffness for the ARC devices 190 based on the predicted lateral acceleration 436 using an equation or a lookup table and adjust the actuators 192 based on or to the stiffness. The equation or lookup table relates predicted lateral accelerations to stiffness. For example, the stiffness may increase as predicted lateral acceleration increases and vice versa.

As stated above, the damping module 448 may adjust the actuators 160 of all of the dampers 158 or less than all of the actuators 160 of the dampers 158. For example, when the predicted lateral acceleration 436 is leftward (e.g., curving or turning rightward), the damping module 448 may adjust the actuators 160 of the dampers 158 on the left side of the vehicle to have higher damping coefficients than the dampers 158 on the right side of the vehicle. The opposite may be true for predicted lateral acceleration 436 rightward. Directions referenced herein may be relative to a normal forward direction of travel of the vehicle. The ARC control module 480 may adjust the actuators 492 of both of the ARC devices 190 to the same stiffness.

In various implementations, an alert module 456 may output an alert via an alert device 460 when the predicted lateral acceleration 436 is greater than a predetermined lateral acceleration capability of the vehicle. The predetermined lateral acceleration capability may be a fixed predetermined acceleration value, or the alert module 456 may set the predetermined lateral acceleration capability such as based on the present characteristics of the dampers 158 and/or ARC devices 190. The alert device 460 may be a visual device (e.g., a display, a light, etc.), an audible device (e.g., a speaker), or a haptic device (e.g., a vibrating device).

Figure 5:
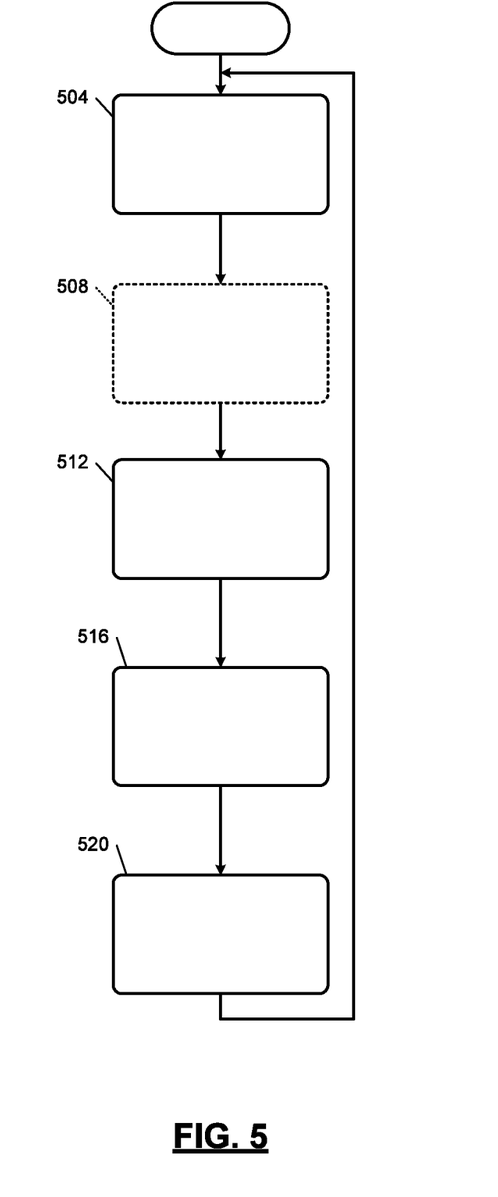
FIGS. 5 and 6 are flowcharts depicting example methods of adjusting suspension system components based on predicted lateral acceleration of the vehicle.

FIG. 5 is a flowchart depicting an example method of adjusting damping of the dampers 158 and/or the stiffness of the ARC devices 190 based on predicted lateral acceleration of the vehicle in the future. Control begins with 504 where the suspension control module 156 receives the inputs, such as the SWA 444, the vehicle speed 440, the GPS data 424, and/or the image 408. At 508, optionally the curvature module 404 determines the radius of curvature of the road in front of the vehicle as discussed above, such as based on the lane boundaries 420 in the image 408 and/or the GPS data 424. In various implementations, the curvature module 404 may determine a first radius of curvature based on the lane boundaries, a second radius of curvature based on the GPS data 424, and determine the radius of curvature the predetermined distance in front of the vehicle based on the first and second radii. For example, the curvature module 404 may set the radius of curvature based on or to an average of the first and second radii (R1+R2)/2 where R1 is the first radius and R2 is the second radius.

At 512, the acceleration module 432 determines the predicted future lateral acceleration 436 of the vehicle. The acceleration module 432 may determine the predicted lateral acceleration 436 based on the radius of curvature 412 and the vehicle speed 440. Alternatively, the acceleration module 432 may determine the predicted lateral acceleration 436 based on the SWA 444.

At 516, the damping module 448 determines the setting(s) for the dampers 158 based on the predicted lateral acceleration 436. For example, the damping module 448 may increase the target damping coefficient for the dampers 158 as the magnitude of the predicted lateral acceleration 436 increases and vice versa. Additionally or alternatively, the ARC control module 480 determines the setting (e.g., stiffness) for the ARC devices 190 based on the predicted lateral acceleration 436. For example, the ARC control module 480 may increase the target stiffness for the ARC devices 190 as the magnitude of the predicted lateral acceleration 436 increases and vice versa.

At 520, the damping module 448 adjusts the actuators 160 of the dampers 158 based on achieving the setting(s). In this manner, the damper(s) 158 is (are) prepared for the future lateral acceleration that will result from the turning of the vehicle and/or road curvature. Additionally or alternatively, the ARC control module 480 adjusts the actuators 192 of the ARC devices 190 based on achieving the setting. In this manner, the ARC devices 190 prepared for the future lateral acceleration that will result from the turning of the vehicle and/or road curvature.

Figure 6:
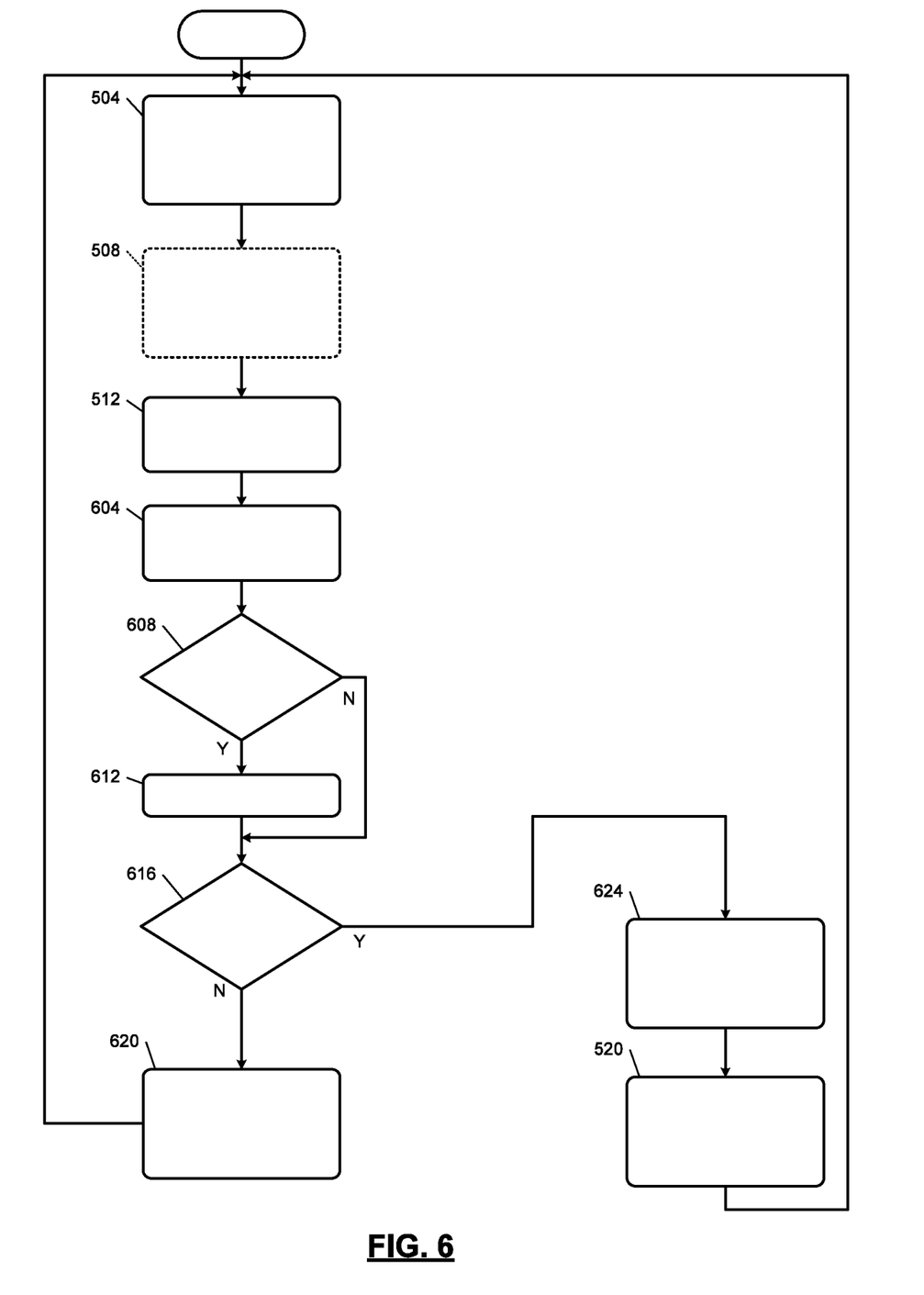

FIG. 6 is a flowchart depicting an example method of adjusting damping of the dampers 158 and/or stiffness of the ARC devices 190 based on predicted lateral acceleration of the vehicle in the future. Control begins with 504-512 as described above. At 604, the damping module 448 and/or the ARC control module 180 determines the present lateral acceleration capability (or capacity) of the vehicle based on the present mode 452. The damping module 448 and/or the ARC control module 480 may determine the present lateral acceleration capability, for example, using a lookup table that relates modes to present lateral acceleration capabilities.

At 608, the alert module 456 determines whether the predicted lateral acceleration 436 is greater than a predetermined maximum lateral acceleration of the vehicle. If 608 is true, the alert module 456 outputs one or more alerts via one or more alert devices at 612 and control continues with 616. If 608 is false, the alert module 456 does not output an alert and control continues with 616.

At 616, the damping module 448 and/or the ARC control module 480 determines whether the predicted lateral acceleration 436 is greater than the present lateral acceleration capability of the vehicle. If 616 is false, the damping module 448 controls the actuators 160 based on the mode 452 and/or the ARC control module 480 controls the ARC devices 190 based on the mode 452 at 620, and control returns to 504. If 616 is true, control transfers to 624.

At 624, the damping module 448 adjusts the setting(s) for the dampers 158 based on the predicted lateral acceleration 436, such as to increase the damping coefficients of the dampers 158. For example, the damping module 448 may increase the target damping coefficient for the dampers 158 as the magnitude of the predicted lateral acceleration 436 increases and vice versa. Additionally or alternatively, the ARC control module 480 adjusts the setting (e.g., target stiffness) for the ARC devices 190 based on the predicted lateral acceleration 436, such as to increase the stiffness of the ARC devices 190. For example, the ARC control module 480 may increase the target stiffness for the ARC devices 190 as the magnitude of the predicted lateral acceleration 436 increases and vice versa.

At 520, the damping module 448 adjusts the actuators 160 of the dampers 158 based on achieving the setting(s). In this manner, the damper(s) 158 is (are) prepared for the future lateral acceleration that will result from the turning of the vehicle and/or road curvature. Additionally or alternatively, the ARC control module 480 adjusts the actuators 192 of the ARC devices 190 based on achieving the setting. In this manner, the ARC devices 190 are prepared for the future lateral acceleration that will result from the turning of the vehicle and/or road curvature.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A suspension control system comprising:
an acceleration module configured to determine a predicted lateral acceleration of a vehicle in the future based on a radius of curvature of a road a predetermined distance in front of the vehicle;
a damping module configured to, before the vehicle reaches the curvature, selectively adjust damping coefficients of adjustable dampers of the vehicle based on the predicted lateral acceleration,
wherein the damping module is configured to: set the damping coefficients based on leftward predicted lateral acceleration such that the adjustable dampers on the left side of the vehicle have higher damping coefficients than the adjustable dampers on the right side of the vehicle; and set the damping coefficients based on rightward predicted lateral acceleration such that the adjustable dampers on the right side of the vehicle have higher damping coefficients than the adjustable dampers on the left side of the vehicle; and
an active roll control (ARC) control module configured to, before the vehicle reaches the curvature, selectively adjust stiffness of ARC devices of the vehicle based on the predicted lateral acceleration.

2. The suspension control system of claim 1 further comprising a curvature module configured to determine the radius of curvature of the road based on an image from a forward facing camera of the vehicle.

3. The suspension control system of claim 1 further comprising a curvature module configured to determine the radius of curvature of the road based on a location and heading of a vehicle.

4. The suspension control system of claim 1 wherein the acceleration module is configured to increase a magnitude of the predicted lateral acceleration as the radius of curvature increases and decrease the magnitude of the predicted lateral acceleration as the radius of curvature decreases.

5. The suspension control system of claim 1 wherein the suspension control system includes the damping module, and the damping module is configured to increase the damping coefficients of the adjustable dampers as the predicted lateral acceleration increases.

6. The suspension control system of claim 1 wherein the damping module is configured to adjust the damping coefficients of all of the adjustable dampers of the vehicle based on the predicted lateral acceleration.

7. The suspension control system of claim 1 further comprising an alert module configured to output an alert via an alert device when the predicted lateral acceleration is greater than a predetermined maximum lateral acceleration of the vehicle.

8. The suspension control system of claim 1 wherein the suspension control system includes the ARC control module, and the ARC control module is configured to increase the stiffness of the ARC devices as the predicted lateral acceleration increases.

9. The suspension control system of claim 1 wherein the suspension control system includes the damping module, and the damping module is configured to:
set the damping coefficients of the adjustable dampers further based on a mode of operation of the adjustable dampers;
determine a present lateral acceleration capability of the vehicle based on the mode; and
before the vehicle reaches the curvature, increase the damping coefficients of adjustable dampers of the vehicle based on the predicted lateral acceleration when a magnitude of the predicted lateral acceleration is greater than the present lateral acceleration capability of the vehicle.

10. The suspension control system of claim 9 wherein the damping module is configured to maintain the damping coefficients based on the mode when the predicted lateral acceleration is less than the present lateral acceleration capability of the vehicle.

11. The suspension control system of claim 1 wherein the suspension control system includes the ARC control module, and the ARC module is configured to:
set the stiffness of the ARC devices based on a mode of operation;
determine a present lateral acceleration capability of the vehicle based on the mode; and before the vehicle reaches the curvature, increase the stiffness of ARC devices of the vehicle based on the predicted lateral acceleration when a magnitude of the predicted lateral acceleration is greater than the present lateral acceleration capability of the vehicle.

12. The suspension control system of claim 11 wherein the ARC control module is configured to maintain the stiffness based on the mode when the predicted lateral acceleration is less than the present lateral acceleration capability of the vehicle.

13. The suspension control system of claim 1 wherein the acceleration module is configured to determine the predicted lateral acceleration of the vehicle further based on a vehicle speed.

14. A suspension control system comprising:
an acceleration module configured to determine a predicted lateral acceleration of a vehicle in the future based on a steering wheel angle of the vehicle;
a damping module configured to, before the vehicle reaches the curvature, selectively adjust damping coefficients of adjustable dampers of the vehicle based on the predicted lateral acceleration,
wherein the damping module is configured to: set the damping coefficients based on leftward predicted lateral acceleration such that the adjustable dampers on the left side of the vehicle have higher damping coefficients than the adjustable dampers on the right side of the vehicle; and set the damping coefficients based on rightward predicted lateral acceleration such that the adjustable dampers on the right side of the vehicle have higher damping coefficients than the adjustable dampers on the left side of the vehicle; and
an active roll control (ARC) control module configured to, before the vehicle reaches the curvature, selectively adjust stiffness of ARC devices of the vehicle based on the predicted lateral acceleration.

15. The suspension control system of claim 14 wherein the acceleration module is configured to increase a magnitude of the predicted lateral acceleration as the steering wheel angle moves away from a predetermined steering wheel angle where the vehicle moves longitudinally.

16. The suspension control system of claim 15 wherein the acceleration module is configured to decrease the magnitude of the predicted lateral acceleration as the steering wheel angle moves toward the predetermined steering wheel angle where the vehicle moves longitudinally.

17. A suspension control method comprising:
determining a predicted lateral acceleration of a vehicle in the future based on a radius of curvature of a road a predetermined distance in front of the vehicle;
before the vehicle reaches the curvature, selectively adjusting damping coefficients of adjustable dampers of the vehicle based on the predicted lateral acceleration,
wherein the selectively adjusting damping coefficients includes: setting the damping coefficients based on leftward predicted lateral acceleration such that the adjustable dampers on the left side of the vehicle have higher damping coefficients than the adjustable dampers on the right side of the vehicle; and setting the damping coefficients based on rightward predicted lateral acceleration such that the adjustable dampers on the right side of the vehicle have higher damping coefficients than the adjustable dampers on the left side of the vehicle; and
before the vehicle reaches the curvature, selectively adjusting stiffness of active roll control (ARC) devices of the vehicle based on the predicted lateral acceleration.

* * * * *